(12) United States Patent
Sakamoto et al.

(10) Patent No.: US 8,747,972 B2
(45) Date of Patent: Jun. 10, 2014

(54) PACKAGING MATERIAL FOR BOIL/RETORT TREATMENT AND POUCH

(71) Applicant: Dai Nippon Printing Co., Ltd., Tokyo (JP)

(72) Inventors: Noriko Sakamoto, Tokyo (JP); Noriyuki Shiina, Tokyo (JP); Eriko Tsukuda, Tokyo (JP); Mitsuru Bushida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/753,673

(22) Filed: Jan. 30, 2013

(65) Prior Publication Data

US 2013/0196099 A1    Aug. 1, 2013

(30) Foreign Application Priority Data

Jan. 31, 2012   (JP) .................................. 2012-018631
May 28, 2012   (JP) .................................. 2012-120602

(51) Int. Cl.
*B29D 22/00*    (2006.01)
*B32B 27/00*    (2006.01)
*B65D 81/34*    (2006.01)

(52) U.S. Cl.
CPC ............ *B32B 27/00* (2013.01); *B65D 81/3415* (2013.01); *B65D 81/34* (2013.01); *B32B 2439/00* (2013.01)
USPC ........................................ 428/35.2; 428/35.4

(58) Field of Classification Search
CPC .......... B32B 27/08; B32B 27/32; B32B 9/00; B32B 27/06; B32B 1/02; B32B 27/34; B32B 2439/00; B65D 81/3415; B65D 81/34
USPC ...................... 428/35.4, 35.2; 383/109, 113
See application file for complete search history.

(56) References Cited

U.S. PATENT DOCUMENTS

| | | | | |
|---|---|---|---|---|
| 4,389,437 A | * | 6/1983 | Hungerford | 428/35.2 |
| 4,716,061 A | * | 12/1987 | Winter | 428/34.3 |
| 5,919,547 A | * | 7/1999 | Kocher et al. | 428/138 |
| 5,939,205 A | * | 8/1999 | Yokoyama et al. | 428/474.4 |
| 6,203,867 B1 | * | 3/2001 | Derkach et al. | 428/35.2 |
| 6,716,499 B1 | * | 4/2004 | Vadhar | 428/35.3 |
| 2013/0196099 A1 | * | 8/2013 | Sakamoto et al. | 428/35.4 |
| 2013/0236612 A1 | * | 9/2013 | Deng et al. | 426/129 |

FOREIGN PATENT DOCUMENTS

| | | |
|---|---|---|
| JP | 4144320 | 6/2008 |
| JP | 4734820 | 5/2011 |

* cited by examiner

*Primary Examiner* — N. Edwards
(74) *Attorney, Agent, or Firm* — Wenderoth, Lind & Ponack, L.L.P.

(57) ABSTRACT

To provide a packaging material for boiling treatment or retort treatment that is inexpensive and has excellent low-elution properties and transparency, as well as a pouch comprising the same.

A packaging material for boil/retort treatment having at least a transparent gas barrier film layer, an adhesive layer and a sealant film layer in that order, the packaging material for boil/retort treatment being one in which, when it is heated at 121° C. for 2 hours by contact with a sufficient amount of 95% ethanol in a one-side elution test, the masses of the unreacted residual ε-caprolactam and ω-laurolactam eluting into the 95% ethanol are no greater than 0.15 mg and no greater than 0.04 mg, respectively, per square inch of the sealant film layer, and a pouch comprising the material.

17 Claims, 4 Drawing Sheets

PACKAGING MATERIAL FOR BOIL/RETORT TREATMENT AND POUCH

TECHNICAL FIELD

The present invention relates to a packaging material for boil/retort treatment and to a pouch comprising it, and more specifically, it relates to a packaging material that can be suitably utilized for packaging of foods, chemicals, beverages and the like, and especially contents that are to be subjected to boil/retort treatment, and to a pouch comprising it.

BACKGROUND ART

Packaging materials for boiling sterilization treatment or retort sterilization treatment, especially low-elution types in which elution of various chemical substances in the packaging material is minimized, have been proposed in the past, and namely packaging materials that employ low-elution materials as the adhesives in the packaging materials, and packaging materials that employ cyclic polyolefins including oxygen absorbents and water vapor absorbents (PTL 1, for example).

Low-elution packaging materials employing non-solvent adhesives and non-solvent inks have also been proposed (PTL 2).

However, these packaging materials are costly and generally unsuitable as packaging materials for foods, and have primarily been used for industrial use and electronic components.

CITATION LIST

Patent Literature

[PTL 1] Japanese Patent No. 4144320
[PTL 2] Japanese Patent No. 4734820

SUMMARY OF INVENTION

Technical Problem

It is an object of the present invention to solve the problem explained above by providing a packaging material for boiling treatment or retort treatment (hereunder referred to as "boil/retort treatment") that is less expensive and has excellent low-elution properties and transparency, as well as a pouch comprising the same.

Solution to Problem

As a result of much research, the present inventors have found that the object stated above can be achieved by a packaging material for boil/retort treatment having at least a transparent gas barrier film layer, an adhesive layer and a sealant film layer in that order, the packaging material for boil/retort treatment being one in which, when it is heated at 121° C. for 2 hours in contact with a sufficient amount of 95% ethanol in a one-side elution test, the masses of unreacted residual ϵ-caprolactam and ω-laurolactam eluting into the 95% ethanol are no greater than 0.15 mg and no greater than 0.04 mg, respectively, per square inch of the sealant film layer.

The present invention has the following features.

1. A packaging material for boil/retort treatment having at least a transparent gas barrier film layer, an adhesive layer and a sealant film layer in that order, the packaging material for boil/retort treatment being one in which, when it is heated at 121° C. for 2 hours in contact with a sufficient amount of 95% ethanol in a one-side elution test, the masses of unreacted residual ϵ-caprolactam and ω-laurolactam eluting into the 95% ethanol are no greater than 0.15 mg and no greater than 0.04 mg, respectively, per square inch of the sealant film layer.

2. The packaging material for boil/retort treatment according to 1. above, wherein the sealant film layer is a layer composed of a multilayer co-extrusion film comprising at least a polypropylene layer and a layer made of nylon 6/12, the polypropylene layer being a layer that forms a wetted surface with the packaging material, the unreacted residual ϵ-caprolactam content of the layer made of nylon 6/12 being no greater than 0.8 wt %, and the unreacted residual ω-laurolactam content being no greater than 0.1 wt %.

3. The packaging material for boil/retort treatment according to 2. above, wherein the sealant film layer is a multilayer co-extrusion film having a first polypropylene layer, a layer made of nylon 6/12 and a second polypropylene layer, in that order.

4. The packaging material for boil/retort treatment according to 2. or 3. above, wherein the transparent gas barrier film layer is a layer made of an inorganic oxide vapor deposition film, comprising at least a base material layer and a vapor deposition layer obtained by vapor deposition of an inorganic oxide on the base material layer.

5. The packaging material for boil/retort treatment according to 4. above, wherein the inorganic oxide vapor deposition film further has a gas barrier coated film on the vapor deposition layer, the gas barrier coated film comprising a hydrolysate of an alkoxide or a hydrolytic condensate of an alkoxide, obtained by polycondensation of a composition comprising at least one alkoxide represented by the general formula $R^1{}_n M(OR^2)_m$ (where M represents a metal atom, $R^1$ and $R^2$ represent C1-8 organic groups, n is an integer of 0 or greater, m is an integer of one or greater, and n+m represents the valence of M), a polyvinyl alcohol, and/or ethylene-vinyl alcohol, by a sol-gel method.

6. The packaging material for boil/retort treatment according to 4. or 5. above, wherein the base material layer is a layer comprising a multilayer co-extrusion film with at least a polyester-based resin layer and a polyamide-based resin layer.

7. The packaging material for boil/retort treatment according to 6. above, wherein the multilayer co-extrusion film is a biaxially stretched multilayer laminated film with a first polyester-based resin layer, a polyamide-based resin layer and a second polyester-based resin layer, in that order, the first and second polyester-based resin layers contain a crystalline polyester, and the polyamide-based resin layer contains 70 to 99 wt % of an aliphatic polyamide and 1 to 30 wt % of an aromatic polyamide.

8. The packaging material for boil/retort treatment according to 7., wherein the crystalline polyester is at least one type of compound selected from the group consisting of polyethylene terephthalate, isophthalic acid-copolymerized polyethylene terephthalate, polybutylene terephthalate and sulfoisophthalic acid-copolymerized polyethylene terephthalate.

9. The packaging material for boil/retort treatment according to 7. or 8. above, wherein the aliphatic polyamide is at least one selected from the group consisting of nylon 6, and copolymerized nylon comprising nylon 6 and nylon 66.

10. The packaging material for boil/retort treatment according to any one of 7. to 9. above, wherein the aromatic polyamide is polymetaxylene adipamide or amorphous nylon.

11. The packaging material for boil/retort treatment according to any one of 4. to 10. above, wherein the vapor deposition layer is a layer obtained by vapor deposition of at least one inorganic oxide selected from the group consisting of silicon oxide, aluminum oxide and magnesium oxide.

12. A pouch for boil/retort treatment comprising a packaging material according to any one of 1. to 11. above, the packaging material being layered with the sealant film layer as the innermost layer to form a bag, wherein in an impurity elution test in which it is filled with deionized/distilled water and subjected to heat treatment at 135° C. for 1 hour, the weight of impurities eluting into the deionized/distilled water is no greater than 0.008 mg per 1 $cm^2$ area of the sealant film layer bordering the contents.

13. The packaging material for boil/retort treatment according to 1. above, wherein the transparent gas barrier film layer is a layer with a biaxially stretched multilayer film obtained by biaxial stretching of a multilayer film having at least a polyester-based resin layer and a polyamide-based resin layer, and the sealant film layer is a layer having at least a layer comprising linear low-density polyethylene.

14. The packaging material for boil/retort treatment according to 13. above, wherein the sealant film layer is a layer composed of a multilayer co-extrusion film comprising at least a linear low-density polyethylene layer and a layer made of nylon 6/12, the linear low-density polyethylene layer being a layer that forms a wetted surface with the packaging material, the unreacted residual ϵ-caprolactam content of the layer made of nylon 6/12 being no greater than 0.8 wt %, and the unreacted residual ω-laurolactam content being no greater than 0.1 wt %.

15. The packaging material for boil/retort treatment according to 13. above, wherein when it is contacted with a sufficient amount of water and extracted for 5 hours at ordinary temperature in a one-side elution test, the masses of the unreacted residual ϵ-caprolactam and ω-laurolactam eluting into the water are no greater than 0.15 mg and no greater than 0.04 mg, respectively, per square inch of the sealant film layer.

16. The packaging material for boil/retort treatment according to 13. above, wherein when it is contacted with a sufficient amount of water and extracted at 100° C. for 8 hours in a one-side elution test, the masses of nitrogen eluting into the water are no greater than 15 µg per square centimeter and no greater than 100 µg per square inch of the sealant film layer.

17. The packaging material for boil/retort treatment according to 13. above, wherein the transparent gas barrier film layer is a layer made of an inorganic oxide vapor deposition film comprising a biaxially stretched multilayer film obtained by biaxial stretching of a multilayer film having at least a polyester-based resin layer and a polyamide-based resin layer, and a vapor deposition layer obtained by vapor deposition of an inorganic oxide on one side thereof.

18. The packaging material for boil/retort treatment according to 17. above, wherein the polyester-based resin layer contains a crystalline polyester, and the polyamide-based resin layer contains 70 to 99 wt % of an aliphatic polyamide and 1 to 30 wt % of an aromatic polyamide.

19. The packaging material for boil/retort treatment according to 18., wherein the crystalline polyester is at least one type of compound selected from the group consisting of polyethylene terephthalate, isophthalic acid-copolymerized polyethylene terephthalate, polybutylene terephthalate and sulfoisophthalic acid-copolymerized polyethylene terephthalate.

20. The packaging material for boil/retort treatment according to 1. or 19. above, wherein the aliphatic polyamide is at least one selected from the group consisting of nylon 6, and copolymerized nylon comprising nylon 6 and nylon 66.

21. The packaging material for boil/retort treatment according to any one of 18. to 20. above, wherein the aromatic polyamide is polymetaxylene adipamide or amorphous nylon.

22. The packaging material for boil/retort treatment according to any one of 17. to 21. above, wherein the vapor deposition layer is a layer obtained by vapor deposition of at least one inorganic oxide selected from the group consisting of silicon oxide, aluminum oxide and magnesium oxide.

23. The packaging material for boil/retort treatment according to 13. above, wherein when it is extracted at 135° C. for 1 hour with deionized/distilled water, the masses of the eluates that elute into the water are no greater than 0.008 mg per square centimeter and no greater than 0.05 mg per square inch of the sealant film layer.

24. The packaging material for boil/retort treatment according to 13. above, wherein when it is extracted at 121° C. for 2 hours with deionized/distilled water, the masses of chloroform-soluble components of the non-volatile extracts eluting into the water are no greater than 0.016 mg per square centimeter and no greater than 0.10 mg per square inch of the sealant film layer.

Advantageous Effects of Invention

The packaging material for boil/retort treatment of the invention is made of inexpensive materials, and exhibits excellent low-elution properties.

In particular, the packaging material of the invention has a layer made of nylon 6/12 in a sealant film, and thereby exhibits excellent low-elution properties. The base film, adhesive and printing ink located further toward the non-solution-contacting side than the sealant film are therefore not limited to special low-elution materials, and any desired materials may be used.

In addition, the packaging material of the invention can withstand boiling treatment and retort treatment, and maintains excellent low-elution properties even under such high-temperature, high-pressure conditions. Consequently, a pouch made of the packaging material of the invention can be suitably used as a pouch for boil/retort treatment, for packaging of foods and beverages.

The packaging material of the invention basically consists of two films, a transparent gas barrier film and a sealant film, laminated through an adhesive, and it can therefore be formed in a thin and lightweight manner, reduces dirt volume, and can lower transport costs for products.

In addition, the base film in the packaging material of the invention is a transparent gas barrier film, which exhibits a high gas barrier property and high transparency, and has excellent quality retaining properties. It can therefore be suitably used for packaging of various different types of contents including various chemical substances that elute from packaging materials, and foods, beverages, pharmaceuticals or electrical and electronic components, which are poorly resistant to oxygen and water vapor that permeate packaging materials.

DESCRIPTION OF EMBODIMENTS

The invention will now be explained in greater detail.

The names of the resins used according to the invention are those commonly used in the industry.

The "density" for the purpose of the invention was measured by a method according to JIS K7112.

<I> Laminar Structure of Packaging Material

Figure 1:
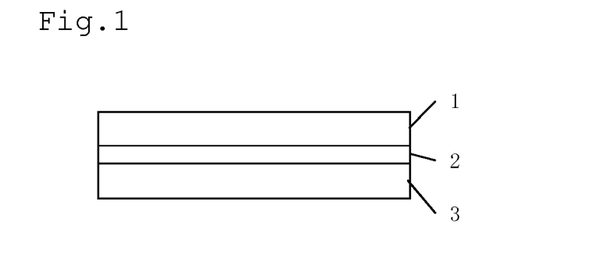
FIG. 1 is a schematic cross-sectional diagram showing an example of the laminar structure of a packaging material of the invention.

As shown in FIG. 1, the packaging material of the invention comprises a transparent gas barrier film layer 1, an adhesive layer 2 and a sealant film layer 3.

Figure 2:
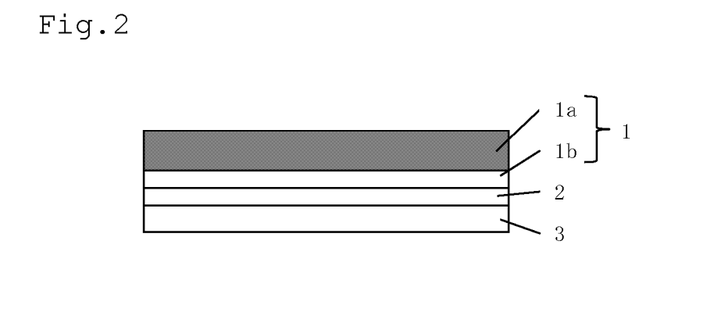
FIG. 2 is a schematic cross-sectional diagram showing an example of the laminar structure of a packaging material of the invention.

As shown in FIG. 2, the packaging material of the invention comprises a transparent gas barrier film layer 1, an adhesive layer 2 and a sealant film layer 3, the transparent gas barrier film layer 1 comprising two layers, a polyester-based resin layer 1a and a polyamide-based resin layer 1b.

Figure 3:
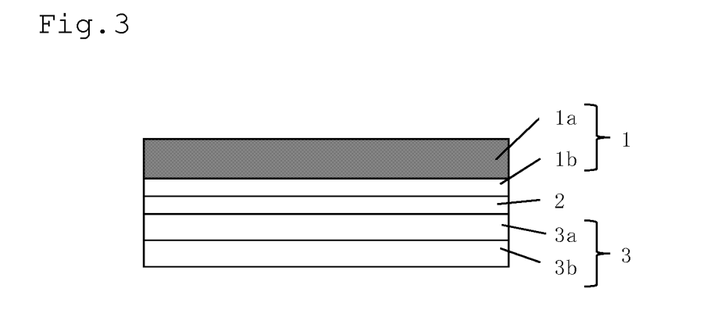
FIG. 3 is a schematic cross-sectional diagram showing an example of the laminar structure of a packaging material of the invention.

According to another mode, as shown in FIG. 3, the sealant film layer 3 in the packaging material of the invention comprises two layers, a layer made of nylon 6/12 3a and a linear low-density polyethylene layer 3b.

Figure 4:
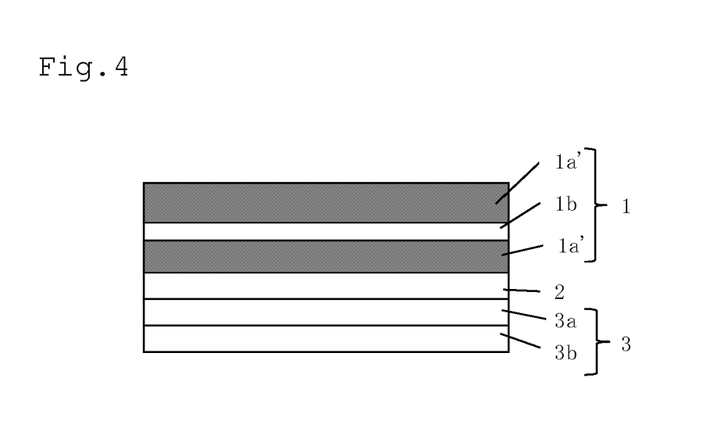
FIG. 4 is a schematic cross-sectional diagram showing an example of the laminar structure of a packaging material of the invention.

According to another mode, as shown in FIG. 4, the transparent gas barrier film layer 1 comprises three layers, a first polyester-based resin layer 1a', a polyamide-based resin layer 1b and a second polyester-based resin layer 1a".

Figure 5:
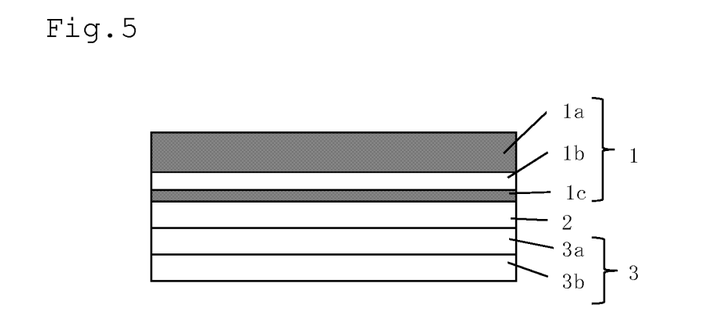
FIG. 5 is a schematic cross-sectional diagram showing an example of the laminar structure of a packaging material of the invention.

According to yet another mode, as shown in FIG. 5, the transparent gas barrier film layer 1 also has a vapor deposition layer 1c, and is a layer made of an inorganic oxide vapor deposition film.

Figure 6:
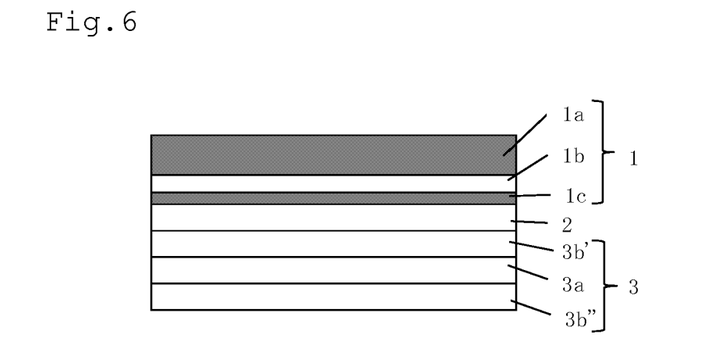
FIG. 6 is a schematic cross-sectional diagram showing an example of the laminar structure of a packaging material of the invention.

Also, as shown in FIG. 6, the sealant film layer 3 comprises three layers, a first linear low-density polyethylene layer 3b', a layer made of nylon 6/12 3a and a second linear low-density polyethylene layer 3h".

Figure 7:
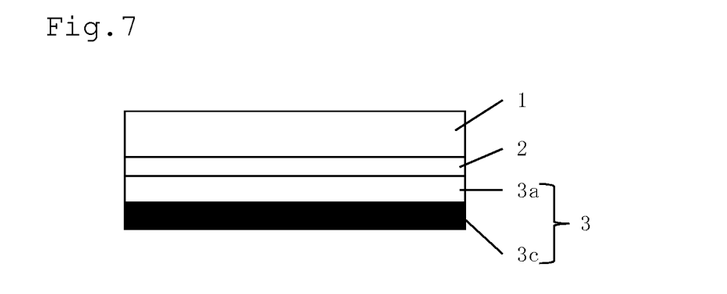
FIG. 7 is a schematic cross-sectional diagram showing an example of the laminar structure of a packaging material of the invention.

According to yet another mode, as shown in FIG. 7, the packaging material of the invention comprises a transparent gas barrier film layer 1, an adhesive layer 2 and a sealant film layer 3, the sealant film layer 3 comprising two layers, a layer made of nylon 6/12 3a and a polypropylene layer 3c. The layer made of nylon 6/12 3a is located on the non-solution-contacting side of the sealant film layer 3, and the polypropylene layer 3c is located on the solution-contacting side of the sealant film layer 3. That is, the polypropylene layer 3c is the uppermost surface layer of the packaging material, and when formed into a package such as a pouch, it forms a wetted surface that borders the contents.

Figure 8:
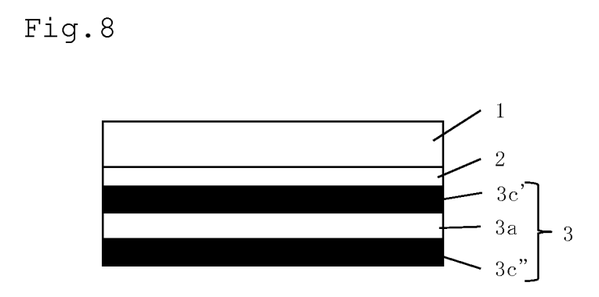
FIG. 8 is a schematic cross-sectional diagram showing an example of the laminar structure of a packaging material of the invention.

According to another mode, as shown in FIG. 8, the sealant film layer 3 of the packaging material of the invention comprises three layers, a first polypropylene layer 3c', a layer made of nylon 6/12 3a and a second polypropylene layer 3c".

Figure 9:
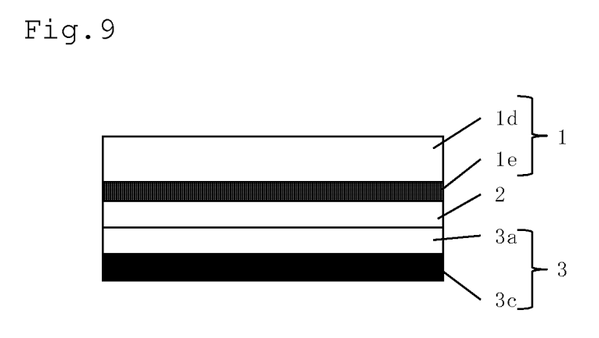
FIG. 9 is a schematic cross-sectional diagram showing an example of the laminar structure of a packaging material of the invention.

According to one mode of the invention, as shown in FIG. 9, the transparent gas barrier film layer 1 is a layer made of an inorganic oxide vapor deposition film comprising a base material layer 1d and a vapor deposition layer 1e.

Figure 10:
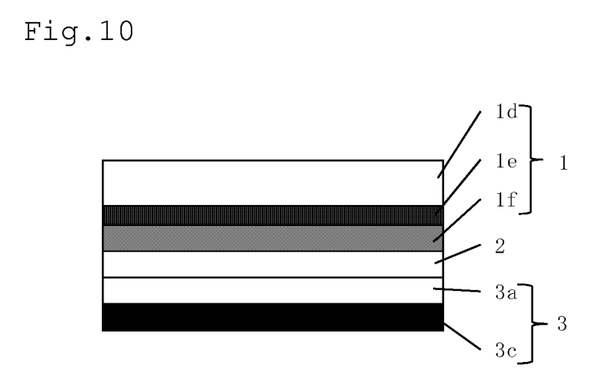
FIG. 10 is a schematic cross-sectional diagram showing an example of the laminar structure of a packaging material of the invention.

Also, as shown in FIG. 10, it may also have a gas barrier coated film 1f on the vapor deposition layer 1e.

Figure 11:
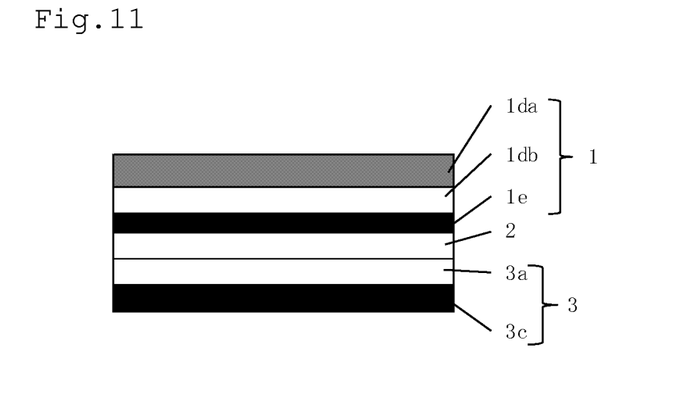
FIG. 11 is a schematic cross-sectional diagram showing an example of the laminar structure of a packaging material of the invention.

According to yet another mode, as shown in FIG. 11, the base material layer 1d comprises two layers, a polyester-based resin layer 1da and a polyamide-based resin layer 1db.

Figure 12:
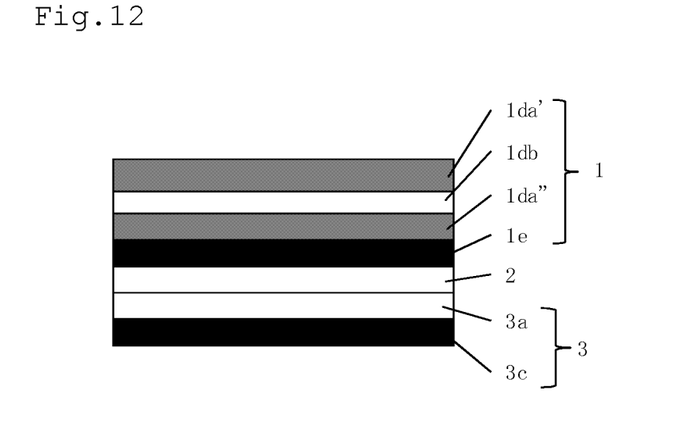
FIG. 12 is a schematic cross-sectional diagram showing an example of the laminar structure of a packaging material of the invention.

According to yet another mode, as shown in FIG. 12, the base material layer 1d comprises three layers, a first polyester-based resin layer 1da', a polyamide-based resin layer 1db and a second polyester-based resin layer 1da".

<II> Transparent Gas Barrier Film Layer

According to the invention, the transparent gas barrier film to be used as the base film may be any of a variety of different transparent gas barrier films, depending on the purpose of use.

The transparent gas barrier film layer is preferably made of an inorganic oxide vapor deposition film, comprising, for example, at least a base material layer and a vapor deposition layer obtained by vapor deposition of an inorganic oxide on the base material layer.

The base material layer of the inorganic oxide vapor deposition film may be a plastic film that has excellent chemical and physical strength, can withstand the conditions of vapor deposition layer formation, and can satisfactorily maintain the properties of the vapor deposition layer without impairment. Examples of such plastic films that may be used include polyolefin-based films such as polypropylene or polyethylene, polyester films such as polyethylene terephthalate or polyethylene naphthalate, polyamide films, polycarbonate films, cyclic olefin copolymer films, cyclic olefin polymer films, liquid crystal polymer films, polyimide films, TAC films, and other types of resin films. For printing suitability and vapor deposition suitability, it is most preferred to use a polyethylene terephthalate (PET) film.

The transparent gas barrier film to be used as the base film for the invention may be, for example, one with a biaxially stretched multilayer film obtained by biaxial stretching of a multilayer film having a polyester-based resin layer with high barrier properties and retort properties and a polyamide-based resin layer with excellent high barrier properties and impact resistance. More preferably, an inorganic oxide is further vapor deposited on the biaxially stretched multilayer film to form a vapor deposition layer, for use as an inorganic oxide vapor deposition film.

According to the invention, the inorganic oxide vapor deposition film may also have a gas barrier coated film provided on the vapor deposition layer in order to further increase the barrier property against oxygen gas and water vapor, depending on the case.

The biaxially stretched multilayer film is obtained by dry laminating a polyester-based resin film and a polyamide-based resin film through an adhesive layer. Both resins may also be co-extruded to form a film by multilayer co-extrusion. Using a multilayer co-extrusion film will permit thickness reduction and weight reduction, and is preferred from an economical and environmental standpoint.

According to this construction, the polyester-based resin layer functions as the outermost layer of the pouch produced using a packaging material of the invention, providing surface heat resistance and stable heat-sealability. It also performs a role which imparts hot water resistance to the packaging bag, and inhibits changes in outer appearance during boil/retort treatment.

The polyamide-based resin layer also performs a function of improving the strength of the packaging material and the pouch composed of it, and imparting impact resistance during transport.

Also, the multilayer co-extrusion film is preferably a biaxially stretched multilayer film having a first polyester-based resin layer, a polyamide-based resin layer and a second polyester-based resin layer, in that order. For a co-extrusion film, it is possible to prevent curling of the film if symmetry is present.

For this construction, the thickness of each layer preferably satisfies $t^{1ab}/(t^{1aa'}+t^{1aa''})=1\text{-}10$ and more preferably $t^{1ab}/(t^{1aa'}+t^{1aa''})=2\text{-}5$, for the relationship between the thickness of the first polyester-based resin layer ($t^{1aa'}$), the thickness of the second polyester-based resin layer ($t^{1aa''}$) and the thickness of the polyamide-based resin layer ($t^{1ab}$).

In this construction, the first polyester-based resin layer performs the function described above, as the outermost layer of the pouch produced using a packaging material of the invention.

The second polyester-based resin layer performs the function of obtaining satisfactory adhesiveness for the base material of the vapor deposition layer provided on the second polyester-based resin layer.

According to the invention, the thickness of the film used as the base material layer or of the biaxially stretched multilayer film is preferably about 6 to 100 μm and preferably about 9 to 50 μm. As regards the thickness relationship of $t^{1ab}/(t^{1aa'}+t^{1aa''})$, a value smaller than 1 corresponds to a thin polyamide-based resin layer, and inability to obtain the necessary strength. Conversely, a value of greater than 10 corresponds to reduced film formability because of a thinner first and/or second polyester-based resin layer, or reduced economy because of an excessively thick polyamide-based resin layer. Also, the thickness of the polyester-based resin layer is preferably 1 to 30 μm for the thickness of each layer, in order to conserve their functions. The thickness of the polyamide-based resin layer is preferably 5 to 50 μm in order to conserve its function.

(Polyester-Based Resin Layer)

In a biaxially stretched multilayer film with the polyester-based resin layer and polyamide-based resin layer, the polyester-based resin forming the polyester-based resin layer preferably contains a crystalline polyester as a major component.

The crystalline polyester is not particularly restricted so long as it can impart functions such as dimensional stability and heat resistance to the packaging material of the invention, and for example, it may be a resin obtained by polycondensation of a dicarboxylic acid and a diol.

Examples of dicarboxylic acids include o-phthalic acid, terephthalic acid, isophthalic acid, succinic acid, adipic acid, sebacic acid, azelaic acid, octylsuccinic acid, cyclohexanedicarboxylic acid, naphthalenedicarboxylic acid, fumaric acid, maleic acid, itaconic acid, decamethylenecarboxylic acid, and their anhydrides and lower alkyl esters, and sulfone group-containing dicarboxylic acids including 5-sulfoisophthalic acid, 2-sulfoisophthalic acid, 4-sulfoisophthalic acid, 3-sulfophthalic acid, dialkyl 5-sulfoisophthalate, dialkyl 2-sulfoisophthalate, dialkyl 4-sulfoisophthalate and dialkyl 3-sulfoisophthalate, and their sodium salts and potassium salts.

Examples of diols include aliphatic diols such as ethylene glycol, 1,3-propane diol, 1,4-butane diol, diethylene glycol, 1,5-pentane diol, 1,6-hexane diol, dipropylene glycol, triethylene glycol, tetraethylene glycol, 1,2-propane diol, 1,3-butane diol, 2,3-butane diol, neopentyl glycol (2,2-dimethylpropane-1,3-diol), 1,2-hexane diol, 2,5-hexane diol, 2-methyl-2,4-pentane diol, 3-methyl-1,3-pentane diol and 2-ethyl-1,3-hexane diol; alkylene oxide addition products such as 2,2-bis(4-hydroxycyclohexyl)propane and 2,2-bis(4-hydroxycyclohexyl)propane, alicyclic diols such as 1,4-cyclohexane diol and 1,4-cyclohexanedimethanol, and sulfone group-containing diols such as 1,3-dihydroxybutane-sulfonic acid and 1,4-dihydroxybutanesulfonic acid.

Particularly preferred among these, from the viewpoint of dimensional stability and heat resistance, are polyethylene terephthalate (PET) wherein the dicarboxylic acid component is terephthalic acid and the diol component is ethylene glycol; isophthalic acid-copolymerized polyethylene terephthalate wherein the dicarboxylic acid components are terephthalic acid (99 to 80 mol %) and isophthalic acid (1 to 20 mol %) and the diol component is ethylene glycol; polybutylene terephthalate (PBT) wherein the dicarboxylic acid component is terephthalic acid and the diol component is 1,4-butane diol; sulfoisophthalic acid-copolymerized polyethylene terephthalate wherein the dicarboxylic acid components are terephthalic acid (99.5 to 90 mol %) and 5-sodiumsulfoisophthalic acid (0.5 to 10 mol %) and the diol component is ethylene glycol, with polyethylene terephthalate (PET) composed of terephthalic acid and ethylene glycol being more preferred.

Such crystalline polyesters are commercially available, and for example, BELLPET-EFG6C and BELLPET PIFG5 (both products of Bell Polyester Products, Inc.) may be used as crystalline polyesters to compose the polyester-based resin layer.

The crystalline polyester used in the polyester-based resin layer may be of a single type, or if necessary two or more different types may be used as a blend.

The polyester-based resin layer may contain a resin that is compatible with the crystalline polyester, if necessary, and the crystalline polyester content may be 50 wt % or greater and preferably 70 wt % or greater with respect to the total weight of the components composing the polyester-based resin layer.

Amorphous polyesters are examples of resins that are compatible with crystalline polyesters. An amorphous polyester is a polyester that has no observable heat of fusion in differential scanning calorimetry based on JIS K 7121. There are no particular restrictions so long as the polyester has such properties, and specific examples include polyesters wherein the dicarboxylic acid component is terephthalic acid and the diol components are ethylene glycol (20 to 80 mol %) and cyclohexanedimethanol (80 to 20 mol %); and polyesters wherein the dicarboxylic acid components are terephthalic acid (20 to 80 mol %) and isophthalic acid (80 to 20 mol %) and the diol component is ethylene glycol. Such amorphous polyesters are commercially available, and for example, there may be used amorphous polyesters such as Eastar Copolyester 6763 (product of Eastman Chemical Company).

Also, known inorganic or organic additives may be added as necessary and appropriate to the polyester-based resin layer, in ranges that do not interfere with the effect of the invention. Inorganic or organic additives that may be added as appropriate include anti-blocking agents, nucleating agents, water-repellent agents, antioxidants, heat stabilizers, lubricants, antistatic agents, coloring agents, pigments, dyes and the like.

(Polyamide-Based Resin Layer)

The polyamide-based resin layer of the biaxially stretched multilayer film having a polyester-based resin layer and a polyamide-based resin layer imparts functions such as flex resistance and impact resistance to the packaging material of the invention. By imparting flex resistance, in particular, it is possible to inhibit reduction in the gas barrier property after bending.

The polyamide-based resin layer contains an aliphatic polyamide and an aromatic polyamide.

(Aliphatic Polyamide)

Aliphatic polyamides include aliphatic nylon and its copolymers. Specific examples include polycapramide (nylon-6), poly-ω-aminoheptanoic acid (nylon-7), poly-ω-aminononanoic acid (nylon-9), polyundecaneamide (nylon-11), polylauryllactam (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,8), caprolactam/lauryllactam copolymer (nylon-6/12), caprolactam/ω-aminononanoic acid copolymer (nylon-6/9), caprolactam/hexamethylene diammonium adipate copolymer (nylon-6/6,6), lauryllactam/hexamethylene diammonium adipate copolymer (nylon-12/6,6), ethylene diamine adipamide/hexamethylene diammonium adipate copolymer (nylon-2,6/6,6), caprolactam/hexamethylene diammonium adipate/hexamethylene diammonium sebacate copolymer (nylon-6/6,6/6,10) and ethylene ammonium adipate/hexamethylene diammonium adipate/hexamethylene diammonium sebacate copolymer (nylon-6/6,6/6,10), and any two or more of these aliphatic polyamides may also be used in combination.

Preferred aliphatic polyamides include nylon-6, nylon-6,6 and nylon-6/6,6 (copolymer of nylon 6 and nylon 6,6), with nylon-6 and nylon-6/6,6 being more preferred and nylon-6 being even more preferred. Two or more different aliphatic polyamides are preferably a combination of nylon-6 and nylon-6/6,6 (in a weight ratio of approximately 50:50 to 95:5).

(Aromatic Polyamide)

Examples of aromatic polyamides include crystalline aromatic polyamides obtained by polycondensation reaction of an aromatic diamine such as metaxylenediamine or paraxylenediamine, and a dicarboxylic acid such as adipic acid, suberic acid, sebacic acid, cyclohexanedicarboxylic acid, terephthalic acid or isophthalic acid, or its derivative. Preferred are crystalline aromatic polyamides such as polymetaxylene adipamide (MXD-nylon). Specific examples include S-6007 and S-6011 (both products of Mitsubishi Gas Chemical Co., Inc.).

Alternatives include amorphous aromatic polyamides (amorphous nylon) obtained by polycondensation reaction of an aliphatic diamine such as hexamethylenediamine and a dicarboxylic acid such as terephthalic acid or isophthalic acid, or its derivative. A preferred example is hexamethylenediamine-terephthalic acid-hexamethylenediamine-isophthalic acid copolymer. A specific example is SEALER PA (by Mitsui-DuPont Polychemical).

Preferred combinations of aliphatic polyamides and aromatic polyamides for the polyamide-based resin layer of the invention include a combination of nylon-6 and MXD-nylon, and a combination of nylon-6 and an amorphous aromatic polyamide (amorphous nylon).

(Contents)

According to the invention, the contents of the aliphatic polyamide and aromatic polyamide in the polyamide-based resin layer are adjusted to 70 to 99 wt % and preferably 85 to 97 wt % of the aliphatic polyamide and 1 to 30 wt % and preferably 3 to 15 wt % of the aromatic polyamide. If the aliphatic polyamide is greater than 99 wt % or the aromatic polyamide is less than 1 wt %, the biaxial stretchability may be reduced and film molding may become difficult. On the other hand, if the aliphatic polyamide is less than 70 wt % or the aromatic polyamide is greater than 30 wt %, the flex resistance will be reduced.

The polyamide-based resin layer may be composed of the aforementioned polyamide-based resin, but if necessary known flex resistance improvers or inorganic or organic additives may be added in ranges that do not interfere with the effect of the invention. Flex resistance improvers include polyolefins, polyester elastomers and polyamide elastomers, which may be added as appropriate in a range of about 0.5 to 10 wt %. Inorganic or organic additives include anti-blocking agents, nucleating agents, water-repellent agents, antioxidants, heat stabilizers, lubricants and antistatic agents. For an anti-blocking agent, for example, silica, talc, kaolin or the like may be added as appropriate in a range of about 100 to 5000 ppm. Incidentally, two or more polyamide-based resin layers may be provided instead of only one.

(Film Formation)

The biaxially stretched multilayer film with a polyester-based resin layer and a polyamide-based resin layer is laminated by co-extrusion of each layer and an adhesive resin layer into the laminar structure described above. For example, the resin for each layer is extruded at a temperature of 200° C. to 300° C., and then co-extruded, in the order for each layer, through a T-die onto a chill roll at 20° C. to 40° C. through which cooling water is circulated, to obtain a flat multilayer film. The obtained film is longitudinally stretched to a factor of 2 to 4 using a roll stretcher at 50° C. to 100° C., for example, transversely stretched to a factor of 3 to 5 using a tenter stretcher in an atmosphere of 90° C. to 150° C., and then subjected to heat treatment in an atmosphere at 100° C. to 240° C. with the same tenter, and cooled. The multilayer stretched film of the invention may be subjected to simultaneous biaxial stretching or sequential biaxial stretching, and the obtained multilayer stretched film may be provided with any desired surface treatment layer on one or both sides, as necessary.

According to the invention, the surface treatment layer may be provided by forming a corona treatment layer, ozone treatment layer, plasma treatment layer, oxidizing treatment layer or the like, by any desired pretreatment such as corona discharge treatment, ozone treatment, cold plasma treatment using oxygen gas or nitrogen gas, glow discharge treatment or oxidizing treatment using a chemical agent.

The surface pretreatment is accomplished by a method for improving contact bondability between various resin films and inorganic oxide vapor deposition films, but the method of improving contact bondability may involve, for example, first forming a primer coat layer, undercoat layer, anchor coat layer, adhesive layer or vapor deposition anchor coat layer on the surface of any of various resin films, to form a surface treatment layer.

As pretreatment coating agent layers there may be used resin compositions wherein the major component of the vehicle is a polyester-based resin, polyamide-based resin, polyurethane-based resin, epoxy-based resin, phenol-based resin, (meth)acrylic-based resin, polyvinyl acetate-based resin, a polyolefin-based resin such as polyethylene or polypropylene, or a copolymer or modified form thereof, or a cellulose-based resin.

(Vapor Deposition Layer)

The vapor deposition layer laminated on the base material layer or biaxially stretched multilayer film according to the invention will now be explained.

The material used to form the vapor deposition layer may be any one that is transparent and has gas barrier properties against oxygen, water vapor and the like, with examples including oxides such as silicon oxide, aluminum oxide, magnesium oxide, calcium oxide, zirconium oxide, titanium oxide, boron oxide, hafnium oxide and barium oxide, and silicon oxide, aluminum oxide and magnesium oxide being especially preferred from the viewpoint of gas barrier properties and production efficiency.

The method of forming the vapor deposition layer may be formation by a chemical vapor deposition method or a physical vapor deposition method.

The vapor deposition layer may be composed of a monolayer formed by a single vapor deposition step, or it may have a multilayer structure formed by several repeated vapor deposition steps. In the case of a multilayer structure, each layer may consist of the same material or of different materials, and may be formed by the same method or by different methods. For example, a vapor deposition film made of silicon oxide may be formed on the base material layer or biaxially stretched multilayer film by a chemical vapor deposition method, and then a vapor deposition film made of aluminum oxide formed by a physical vapor deposition method.

The layer thickness of the vapor deposition layer may be appropriately set in the range of 5 to 100 nm and more preferably 10 to 50 nm, as the total thickness of all the layers. Exceeding 100 nm is undesirable because the flexibility may be reduced and cracks may be generated in the vapor deposition layer under external force such as bending or stretching after film formation, the transparency may be reduced, the stress of the material itself may increase, and coloration may result. A thickness exceeding 100 nm is also undesirable because productivity will be significantly reduced and protrusions will tend to form by growth of aberrant particles. If the thickness of the inorganic compound layer is less than 5 nm, on the other hand, the transparency will be satisfactory but it will be difficult to obtain a homogeneous layer and the gas barrier property function will not be easily exhibited in a sufficient manner.

(Gas Barrier Coated Film)

By forming a vapor deposition layer on the base material layer or biaxially stretched multilayer film and further providing a gas barrier coated film on the vapor deposition layer, it is possible not only to obtain more excellent gas barrier properties, but also to increase contact bondability with the adhesive layer and obtain even higher gas barrier properties.

According to the invention, a gas barrier coated film is a film that is obtained by coating and drying a gas barrier composition obtained by polycondensation of an alkoxide and a water-soluble polymer by a sol-gel method.

The alkoxide used for the gas barrier composition may be at least one type of alkoxide represented by the general formula $R^1{}_nM(OR^2)_m$ (where M represents a metal atom, $R^1$ and $R^2$ each represent a C1-8 organic group, n is an integer of 0 or greater, m is an integer of 1 or greater and n+m represents the valence of M).

Also, the water-soluble polymer used is preferably polyvinyl alcohol or ethylene-vinyl alcohol, or both.

According to the invention, the alkoxide represented by the general formula $R^1{}_nM(OR^2)_m$ may employ silicon, zirconium, titanium, aluminum or the like as the metal atom M. Also according to the invention, alkoxides of one or more different metal atoms may be used in admixture in the same solution.

Specific examples of organic groups represented by $R^1$ in an alkoxide represented by the general formula $R^1{}_nM(OR^2)_m$, include methyl, ethyl, n-propyl, i-propyl, n-butyl, i-butyl, sec-butyl, t-butyl, n-hexyl, n-octyl, and other alkyl groups.

Specific examples of organic groups represented by $R^2$ in an alkoxide represented by the general formula $R^1{}_nM(OR^2)_m$, include methyl, ethyl, n-propyl, i-propyl, n-butyl, sec-butyl, and other alkyl groups.

According to the invention, these alkyl groups may be the same or different in the same molecule.

The alkoxide represented by the general formula $R^1{}_nM(OR^2)_m$ according to the invention may be, for example, an alkoxysilane where M is Si, examples of alkoxysilanes including tetramethoxysilane $Si(OCH_3)_4$, tetraethoxysilane $Si(OC_2H_5)_4$, tetrapropoxysilane $Si(OC_3H_7)_4$ and tetrabutoxysilane $Si(OC_4H_9)_4$.

Also according to the invention, the content of the polyvinyl alcohol and/or ethylene-vinyl alcohol is preferably in the range of 5 to 500 parts by weight with respect to 100 parts by weight as the total of the alkoxide. If the content exceeds 500 parts by weight, the brittleness of the formed gas barrier coated film will undesirably increase.

According to the invention, the polyvinyl alcohol used may generally be one obtained by saponification of polyvinyl acetate. Specific examples of polyvinyl alcohols include PVA110 (saponification degree=98-99%, polymerization degree=1100), PVA117 (saponification degree=98-99%, polymerization degree=1700), PVA124 (saponification degree=98-99%, polymerization degree=2400) and PVA135H (saponification degree 99.7%, polymerization degree=3500) by Kuraray Co., Ltd., the RS polymer RS-110 (saponification degree=99%, polymerization degree=1,000) and KURARAY POVAL LM-2050 (saponification degree=40%, polymerization degree=2,000) by the same manufacturer, and GOHSENOL NM-14 (saponification degree=99%, polymerization degree=1,400) and GOHSENOL NH-18 (saponification degree=98-99%, polymerization degree=1700) by Nippon Synthetic Chemical Industry Co., Ltd.

According to the invention, the ethylene-vinyl alcohol used may be a saponification product of a copolymer of ethylene and vinyl acetate, i.e. one obtained by saponification of an ethylene-vinyl acetate random copolymer. Such saponification products include partial saponification products having several tens of mol % of residual acetic acid groups, and complete saponification products having only a few mol % of residual acetic acid groups or having absolutely no residual acetic acid groups. While this is not particularly restrictive, from the viewpoint of gas barrier properties it is preferred to use one with a saponification degree of preferably 80 mol % or greater, more preferably 90 mol % or greater and even more preferably 95 mol % or greater. Also, it is preferred to use one wherein the content of ethylene-derived repeating units in the ethylene-vinyl alcohol (hereunder also referred to as "ethylene content") is generally 0 to 50 mol % and preferably 20 to 45 mol %. Specific examples of such ethylene-vinyl alcohols include EVAR EP-F101 (ethylene content: 32 mol %) by Kuraray Co., Ltd., and SOARNOL D2908 (ethylene content: 29 mol %) by Nippon Synthetic Chemical Industry Co., Ltd.

According to the invention, a silane coupling agent or the like may be added to prepare the gas barrier composition to be used to form the gas barrier coated film of the invention. Silane coupling agents that may be suitably used include amino group-containing silane coupling agents such as N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane and N-phenyl-3-aminopropyltrimethoxysilane, epoxy group-containing silane coupling agents such as 2-(3,4-epoxycyclohexyl)ethyltrimethoxysilane, 3-glycidoxypropyltrimethoxysilane, 3-glycidoxypropylmethyldiethoxysilane and 3-glycidoxypropyltriethoxysilane, mercapto group-containing silane coupling agents such as 3-mercaptopropylmethyldimethoxysilane and 3-mercaptopropyltrimethoxysilane, and isocyanate group-containing silane coupling agents such as 3-isocyanatepropyltriethoxysilane and 3-isocyanatepropyltrimethoxysilane.

The gas barrier composition to be used for the invention may be prepared by hydrolysis of an alkoxide and a water-soluble polymer by a sol-gel method in the presence of an acid, water and an organic solvent, followed by polycondensation.

The gas barrier coated film may be formed by coating a gas barrier composition onto the vapor deposition layer, and conducting heat treatment at a temperature of 20° C. to 200° C. and preferably 140° C. or higher, and no higher than the melting point of the plastic film composing the base material layer, for a period of between 10 seconds and 10 minutes.

Examples for acids to be used for preparation of the gas barrier composition include mineral acids such as sulfuric acid, hydrochloric acid and nitric acid, and organic acids such as acetic acid and tartaric acid, as well as other acids. Examples of organic solvents that may be used include methyl alcohol, ethyl alcohol, isopropyl alcohol and n-propyl alcohol.

The polyvinyl alcohol and/or ethylene-vinyl alcohol for the gas barrier composition is preferably in a state dissolved in a coating solution containing an alkoxide or silane coupling agent, and the type of organic solvent is appropriately selected for this purpose. According to the invention, the ethylene-vinyl alcohol that has been solubilized in the solvent may be a commercially available product such as SOARNOL (product of Nippon Synthetic Chemical Industry Co., Ltd.), for example.

The gas barrier composition is coated on the vapor deposition layer and heated to remove the solvent and the alcohol produced by polycondensation reaction, thereby completing the polycondensation reaction and forming a transparent gas barrier coated film.

Contact bondability between the vapor deposition layer and gas barrier coated film is satisfactory due to bonding between the hydroxyl groups produced by hydrolysis or silanol groups from the silane coupling agent, with hydroxyl groups on the surface of the vapor deposition layer.

By this bond formation, the gas barrier coated film of the invention adopts a structure that includes a linear polymer with crystallinity and has numerous fine crystals embedded in the amorphous portion. The crystal structure is similar to a crystalline organic polymer (for example, vinylidene chloride or polyvinyl alcohol), while polar groups (OH) are present in some of the molecules and the molecular cohesive energy is high, such that satisfactory surface gas barrier properties are exhibited.

According to the invention, the vapor deposition layer and the gas barrier coated film form chemical bonds and hydrogen bonds by hydrolysis and co-condensation, and also coordination bonds, thus increasing the adhesiveness between the layers and producing a synergistic effect, such that a more satisfactory surface gas barrier property effect can be exhibited.

According to the invention, the method for coating the gas barrier composition may be, for example, application with coating means such as roll coating, with a gravure roll coater or the like, spray coating, dipping, brushing, bar coating or applicator coating, by a single application or multiple applications, to form a gas barrier coated film to a dry film thickness of 0.01 to 30 μm and preferably 0.1 to 10 μm.

In order to obtain higher surface gas barrier properties according to the invention, after the gas barrier coated film has been formed, the vapor deposition layer and gas barrier coated film may be repeatedly laminated in an alternating manner one or more times in order, preferably with the gas barrier coated film formed on the outermost layer, to obtain a transparent gas barrier film.

The transparent gas barrier film of the invention has particularly excellent gas barrier properties (for $O_2$, $N_2$, $H_2O$, $CO_2$ and the like), and can therefore be suitably used as a film for food packaging. Particularly when used in a gas package which is to be filled with $N_2$ or $CO_2$ gas, the excellent gas barrier properties are highly effective for maintaining the packaging gas.

The transparent gas barrier film of the invention also has excellent gas barrier properties after hot water treatment, and especially high-pressure hot water treatment (retort treatment).

<III> Adhesive Layer

According to the invention, the adhesive used to compose the adhesive layer may be, for example, a polyvinyl acetate-based adhesive, a polyacrylic acid ester-based adhesive composed of a homopolymer of ethyl acrylate, butyl acrylate, 2-ethylhexyl ester or the like, or a copolymer of these with methyl methacrylate, acrylonitrile, styrene or the like, a cyano acrylate-based adhesive, an ethylene copolymer-based adhesive composed of a copolymer of ethylene with a monomer such as vinyl acetate, ethyl acrylate, acrylic acid or methacrylic acid, a cellulose-based adhesive, a polyester-based adhesive, a polyamide-based adhesive, a polyimide-based adhesive, an amino resin-based adhesive made of a urea resin or melamine resin, a phenol resin-based adhesive, an epoxy-based adhesive, a polyurethane-based adhesive, a reactive (meth)acrylic-based adhesive, a rubber-based adhesive made of chloroprene rubber, nitrile rubber, styrene-butadiene rubber or the like, a silicone-based adhesive, or an inorganic adhesive made of an alkali metal silicate or low melting point glass.

The adhesive may be in the form of an aqueous, solution-type, emulsion-type or dispersed composition, as a film, sheet, powder, solid or the like, and the bonding mechanism may be by chemical reaction, solvent volatilization, heat-fusion, thermocompression, or the like.

According to the invention, the entire surface of the transparent gas barrier film layer may be coated with the adhesive by a coating method such as roll coating, gravure roll coating or kiss coating, or by a printing method, and then the solvent dried off to form an adhesive layer, and preferably the coating coverage is about 0.1 to 10 $g/m^2$ (when dry).

<IV> Sealant Film Layer

In the packaging material of the invention, the sealant film has the function of melting by heat and fusing together, and providing excellent adhesion and hot water resistance to withstand retort treatment, as well as providing a low-elution property for the packaging material of the invention.

The sealant film layer in the packaging material of the invention has at least a linear low-density polyethylene layer, as a material that satisfies all of these properties. Especially from the viewpoint of increasing the effect of providing a low-elution property to the packaging material of the invention, it is preferably a multilayer co-extrusion film with a linear low-density polyethylene layer and a layer made of nylon 6/12. The linear low-density polyethylene layer forms a wetted surface on the packaging material of the invention, exhibiting a stable heat seal property as the innermost layer when a pouch is formed using the packaging material of the invention.

Also, the sealant film layer may be, for example, a multilayer co-extrusion film having a polypropylene layer and a layer made of nylon 6/12. The polypropylene layer forms a wetted surface on the packaging material of the invention, exhibiting a stable heat seal property as the innermost layer when a pouch is formed using the packaging material of the invention.

For either of the aforementioned multilayer co-extrusion films, it is preferred to use a multilayer co-extrusion film wherein the content of unreacted residual ε-caprolactam in the layer made of nylon 6/12 is no greater than 0.8 wt %, and the content of unreacted residual ω-laurolactam is no greater than 0.1 wt %.

It is also preferred to use a multilayer co-extrusion film wherein, upon contacting a sufficient amount of 95% ethanol with the surface of the sealant film layer of the packaging material of the invention and heating at 121° C. for 2 hours, in a one-side elution test carried out according to FDA (US Food and Drug Administration) Standard Test §177•1500 13.2 (nylon 6/12), the masses of unreacted residual ε-caprolactam and ω-laurolactam eluting into the 95% ethanol are no greater than 0.15 mg and 0.04 mg, respectively, per square inch of the sealant film layer.

A packaging material for boiling treatment is also preferably one employing the aforementioned multilayer co-extrusion film wherein, when the surface of the sealant film layer of the packaging material of the invention is contacted with a sufficient amount of water and extracted for 5 hours at ordinary temperature (23° C.) in a similar one-side elution test, the masses of the unreacted residual ε-caprolactam and ω-laurolactam eluting into the water are no greater than 0.15 mg and no greater than 0.04 mg, respectively, per square inch of the sealant film layer.

A packaging material for boiling treatment is also preferably one employing a multilayer co-extrusion film wherein, when the surface of the sealant film layer of the packaging material of the invention is contacted with a sufficient amount of water and extracted at 100° C. for 8 hours in a similar one-side elution test, the masses of nitrogen eluting into the water are no greater than 15 μg per square centimeter and no greater than 100 μg per square inch of the sealant film layer.

The multilayer co-extrusion film itself has a low content of eluting chemical substances, and has an excellent shielding function against the eluting chemical substances in the transparent gas barrier film layer and adhesive layer, and can therefore prevent their migration into held contents. It additionally permits thickness reduction and weight reduction to be realized, and is therefore also preferred from an economical and environmental standpoint.

(Multilayer Co-Extrusion Film with Linear Low-Density Polyethylene Layer and Layer Made of Nylon 6/12)

A multilayer co-extrusion film with a linear low-density polyethylene layer and a layer made of nylon 6/12 according to the invention having the construction described above is formed by multilayer co-extrusion of a linear low-density polyethylene layer with an excellent heat seal property and hot water resistance, and a layer made of nylon 6/12 that imparts low-elution properties to the packaging material of the invention.

According to another mode, the multilayer co-extrusion film is preferably a multilayer co-extrusion film having a first linear low-density polyethylene layer, a layer made of nylon 6/12 and a second linear low-density polyethylene layer, in that order. For a co-extrusion film, it is possible to prevent curling of the film if symmetry is present. The second linear low-density polyethylene layer performs the role of increasing adhesiveness between the adhesive layer and sealant film layer.

The thickness of each layer of the multilayer co-extrusion film may be determined by the judgment of a person skilled in the art within ranges in which the role of each layer is performed, and each linear low-density polyethylene layer may be set to about 5-100 μm/layer while the layer made of nylon 6/12 may be set to about 5-50 μm.

According to the invention, the linear low-density polyethylene is linear polyethylene with a density of 0.910 to 0.925 $g/cm^3$, obtained by polymerization of ethylene monomer using a polymerization method such as a low-pressure method, slurry method, solution method or gas phase method. According to the invention, any one may be used that has desired properties within a range that does not impair the effect, but from the viewpoint of excellent structural uniformity, linear low-density polyethylene prepared with a metallocene catalyst may be suitably used. Known inorganic or organic additives may also be appropriately added as necessary to the linear low-density polyethylene layer.

According to the invention, the nylon 6/12 composing the layer made of nylon 6/12 is produced by copolymerization of ε-caprolactam and ω-laurolactam. The ratio of these comonomers may be appropriately set by a person skilled in the art depending on the purpose of use, and preferably the ε-caprolactam:ω-laurolactam ratio is 50:50 to 95:5 (weight ratio), while a copolymer at 50:50 (weight ratio), for example, or a copolymer at ≥80 wt %:<20 wt %, may also be suitably used. According to the invention, 6/69 nylon may also be used instead of nylon 6/12.

(Multilayer Co-Extrusion Film with Polypropylene Layer and Layer Made of Nylon 6/12)

A multilayer co-extrusion film with a polypropylene layer and a layer made of nylon 6/12 according to the invention having the construction described above is formed by multilayer co-extrusion of a polypropylene layer with an excellent heat seal property and hot water resistance, and a layer made of nylon 6/12 that imparts low-elution properties to the packaging material of the invention.

According to yet another mode, the sealant film is preferably a multilayer co-extrusion film having a first polypropylene layer, a layer made of nylon 6/12 and a second polypropylene layer, in that order. For a co-extrusion film, it is possible to prevent curling of the film if symmetry is present. The second polypropylene layer performs the role of increasing adhesiveness between the adhesive layer and sealant film layer.

The thickness of each layer of the sealant film may be determined by the judgment of a person skilled in the art within ranges in which the role of each layer is performed, and each polypropylene layer and layer made of nylon 6/12 may be set to, for example, about 5 to 50 μm/layer.

According to the invention, the polypropylene used may be one with any desired physical properties within a range that does not interfere with the effect of the invention. Known inorganic or organic additives may also be appropriately added as necessary to the polypropylene layer.

According to the invention, the nylon 6/12 composing the layer made of nylon 6/12 may be one mentioned for the multilayer co-extrusion film that has a linear low-density polyethylene layer and a layer made of nylon 6/12.

<V> Packaging Material

The packaging material of the invention is produced by laminating the aforementioned transparent gas barrier film and sealant film through an adhesive layer, so that the laminar structure described above is formed.

Also according to the invention, the aforementioned sealant film is dry laminated on the adhesive layer that has been laminated on the transparent gas barrier film layer.

If necessary, another resin film (interlayer) may be inserted between the adhesive layer and the sealant film layer. Providing such an interlayer will improve the strength and pierce resistance. The resin film used may be a resin film with excellent mechanical, physical and chemical strength, excellent pierce resistance, and also excellent heat resistance, moisture proofness, pinhole resistance and transparency.

Specifically, there may be used a polyester-based resin, polyamide-based resin, polyaramid-based resin, linear low-density polyethylene-based resin, polypropylene-based resin, polycarbonate-based resin, polyacetal-based resin, fluorine-based resin, or another tough resin film.

According to the invention, the resin film described above is used, and this may be inserted between the adhesive layer and the sealant film layer by a dry laminate method using an adhesive such as mentioned above.

The resin film used may be an unstretched film, or a stretched film obtained by stretching in a uniaxial direction or biaxial direction. Also according to the invention, the thickness of the resin film may be any thickness that can maintain the necessary minimum for strength and pierce resistance, but if it is too thick the cost will be disadvantageously increased, whereas if it is too thin the strength and pierce resistance will be undesirably reduced. Furthermore, since the transparent gas barrier film has a polyamide-based resin layer it will exhibit its original excellent impact strength or pierce resistance, and its use should therefore be limited to the necessary minimum, for environmental considerations.

The packaging material of the invention exhibits excellent low-elution properties.

Specifically, in an elution test carried out according to FDA (US Food and Drug Administration) Standard Test §176•170 (c), under conditions depending on the type of contents and use conditions, with contact of the sealant layer surface with a sufficient amount of water and heating at 121° C. for 2 hours, the packaging material of the invention has an elution mass for elution into the water of no greater than 0.5 mg per square inch of the sealant film layer. Similarly, when the sealant layer surface is contacted with a sufficient amount of heptane and heated at 66° C. for 2 hours, the elution mass for elution into the heptane is no greater than 0.5 mg per square inch of the sealant film layer.

Furthermore, when the sealant layer surface of the packaging material of the invention is contacted with a sufficient amount of deionized/distilled water and heated at 121° C. for 2 hours in an elution test similar to that described above, the masses of chloroform-soluble components of the non-volatile extracts eluting into the water are no greater than 0.016 mg per square centimeter and no greater than 0.10 mg per square inch of the sealant film layer. Likewise, when the sealant layer surface is contacted with a sufficient amount of deionized/distilled water and heated at 135° C. for 1 hour, the elution masses that elute into the water are no greater than 0.008 mg per square centimeter and no greater than 0.05 mg per square inch of the sealant film layer.

<VI> Pouch

The packaging material of the invention is layered with the sealant film layer as the innermost layer to form a bag, to allow production of a pouch that can be suitably used for boil/retort treatment.

The bag forming method may be one in which the packaging material of the invention is bent or layered so that the sealant layer surfaces face each other, and the surrounding edges are heat sealed in a heat sealing form such as a side seal, two-way seal, three-way seal, four-way seal, envelope seal, butt-seam seal (pillow seal), folded seal, flat-bottom seal, square-bottom seal or gauzette, to produce pouches of various types. Self-standing packaging bags (standing pouches), for example, may also be used.

The method of heat sealing may be a known method such as bar sealing, revolving roll sealing, belt sealing, impulse sealing, high-frequency sealing or ultrasonic sealing.

The pouch of the invention exhibits excellent low-elution properties. Specifically, in a retort product-specific elution test carried out according to FDA (US Food and Drug Administration) Standard Test §177•1390, with contact of the sealant layer surface with a sufficient amount of deionized/distilled water and heating at 135° C. for 1 hour, the elution mass for elution into the deionized/distilled water is no greater than 0.05 mg per square inch of the sealant film layer.

EXAMPLES

The invention will now be explained in greater detail with reference to examples, with the understanding that the invention is not limited by these examples. The following symbols were used:

PET: Polyethylene terephthalate
NY: Nylon
LLDPE: Linear low-density polyethylene Example 1

(1) Using a biaxial stretching polyethylene terephthalate film (thickness: 12μ) as the base material, it was mounted on the delivery roll of a plasma chemical vapor deposition apparatus, and then a silicon oxide vapor deposition film with a thickness of 200 angstroms was formed on the corona treated side of the base material, under the following conditions.

(Vapor Deposition Conditions)

Vapor deposition surface: Corona treated surface
Injected gas:Hexamethyldisiloxane:oxygen gas:helium=1.0:3.0:3.0 (units: slm)
Degree of vacuum in vacuum chamber: $2-6 \times 10^{-6}$ mBar
Degree of vacuum in vapor deposition chamber: $2-5 \times 10^{-3}$ mBar
Cooling/electrode drum power supply: 10 kW
Line speed: 100 m/min Next, immediately after forming the silicon oxide vapor deposition film with a film thickness of 200 angstroms, the silicon oxide vapor deposition film side was subjected to oxygen/argon mixed gas plasma treatment using a glow discharge plasma generation apparatus at a power of 9 kw, with a mixed gas comprising oxygen gas:argon gas=7.0:2.5 (units: slm), and a mixed gas pressure of $6 \times 10^{-5}$ Torr, to form a plasma treated surface by which the silicon oxide vapor deposition film surface tension increased by at least 54 dyne/cm.

(2) Separately, using the compositions listed in Table 1 below, to composition (a): an EVOH solution in a mixed solvent of EVOH, isopropyl alcohol and ion-exchanged water, there was added a previously prepared hydrolysate of composition (b): ethylsilicate 40, isopropyl alcohol, aluminum acetylacetone and ion-exchanged water, the mixture was stirred, and there was further added a previously prepared mixture of composition (c): polyvinyl alcohol, acetic acid, isopropyl alcohol and ion-exchanged water, and the mixture was stirred to obtain a colorless transparent gas barrier coated film-forming composition.

TABLE 1

| | | |
|---|---|---|
| a. | EVOH (Ethylene copolymerization ratio: 29%) | 0.122 wt % |
| | Isopropyl alcohol | 0.659 wt % |
| | $H_2O$ | 0.439 wt % |
| b. | b. Ethylsilicate 40 (Colcoat) | 9.146 wt % |
| | Isopropyl alcohol | 8.780 wt % |
| | Aluminum acetylacetone | 0.018 wt % |
| | $H_2O$ | 16.291 wt % |
| c. | c. Polyvinyl alcohol | 1.220 wt % |
| | Isopropyl alcohol | 19.893 wt % |
| | $H_2O$ | 43.329 wt % |
| | Acetic acid | 0.103 wt % |
| Total | | 100 wt % |

The gas barrier coated film-forming composition prepared earlier was then coated onto the plasma treated side formed in (1) above by gravure roll coating, and after the coating, it was passed through a drying furnace at 200° C. at a speed of 300 m/min for heat treatment to form a gas barrier coated film with a thickness of 0.4 g/m² (dry state), to produce a transparent gas barrier film.

(3) Separately, a polypropylene resin and nylon 6/12 were used to produce the following three-layer structure multilayer co-extrusion film: first polypropylene layer (27.5 μm)/layer made of nylon 6/12 (15 μm)/second polypropylene layer (27.5 μm). In the layer made of nylon 6/12, the unreacted residual ϵ-caprolactam content was 0.5 wt % and the unreacted residual ω-laurolactam content was 0.03 wt %. Also, upon contacting the multilayer co-extrusion film with a sufficient amount of 95% ethanol and heating at 121° C. for 2 hours in an one-side elution test, the masses of unreacted residual ϵ-caprolactam and ω-laurolactam eluting into the 95% ethanol were no greater than 0.10 mg and 0.02 mg, respectively, per square inch of the sealant film layer.

(4) Next, a prescribed printed pattern was formed on the gas barrier coated film surface of the transparent gas barrier film formed in (2) above, and a polyester-based adhesive (product of Rock Paint Co., active compound: RU-004, curing agent: H-1) was coated over the entire surface containing the printed pattern to a thickness of 3 μm by a gravure roll coating method to form an adhesive layer, and this was dry laminated with the multilayer co-extrusion film obtained in (3) above to produce a packaging material of the invention.

The final laminar structure was the following: transparent gas barrier film layer, 12 μm (PET film/vapor deposition layer/gas barrier coated film)/adhesive layer, 3 μm/sealant film layer, 70 μm (first polypropylene/nylon 6/12/second polypropylene).

(5) The packaging material obtained in (4) above was cut to 13 cm in the lengthwise direction and 18 cm in the widthwise direction and overlayed with the sealant film layer surfaces facing each other, and sealed with a three-way heat seal to form a seal section while producing a flat pouch with an opening on the upper side. Next, 150 ml of deionized/distilled water was filled through the opening, and the opening was heat sealed at 180° C., forming an upper seal section, to produce a packaged intermediate product, which was placed in a hot water retort pasteurizer and subjected to pressurization and superheating sterilization for 30 minutes at a temperature of 127° C. After cooling to room temperature, the mass of eluted components in the deionized/distilled water was measured to be 0.004 mg per 1 cm² of sealant film contacting with the deionized/distilled water.

Example 2

A packaging material and pouch of the invention were produced in the same manner as Example 1. However, as the sealant film there was produced a multilayer co-extrusion film with the following two-layer structure: layer made of nylon 6/12 (15 μm)/polypropylene layer (55 μm), and the surface of the layer made of nylon 6/12 was facing the adhesive layer for lamination.

Example 3

A packaging material and pouch of the invention were produced in the same manner as Example 1. However, the base material used was a multilayer extrusion film with the three-layer structure: PET (1.5 μm)/nylon (12 μm)/PET (1.5 μm) (product of Gunze, Ltd.).

The mass of eluted components were measured for the obtained pouch in the same manner as Example 1, and found to be 0.005 mg per 1 cm² of sealant film contacting with the deionized/distilled water.

Example 4

A packaging material and pouch of the invention were produced in the same manner as Example 3. However, as the sealant film there was produced a multilayer co-extrusion film with the two-layer structure: layer made of nylon 6/12 (15 μm)/polypropylene layer (55 μm), and the surface of the layer made of nylon 6/12 was facing the adhesive layer for lamination.

Example 5

A packaging material and pouch of the invention were produced in the same manner as Example 1. However, the base material used was a multilayer extrusion film with the three-layer structure: PET (3 μm)/nylon (12 μm) (product of Gunze, Ltd.).

Example 6

A packaging material and pouch of the invention were produced in the same manner as Example 5. However, as the sealant film there was produced a multilayer co-extrusion film with the two-layer structure: layer made of nylon 6/12 (15 μm)/polypropylene layer (55 μm), and the surface of the layer made of nylon 6/12 was facing the adhesive layer for lamination.

Example 7

For the transparent barrier layer, a multilayer stretched film with the three-layer structure PET/NY/PET (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having LLDPE through an adhesive layer. The final laminar structure was as follows: transparent vapor deposition layer (1.5μ PET/12μ NY/1.5μ PET), 15μ/adhesive layer, 3μ/LLDPE, 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.005 mg/cm$^2$.

Example 8

For the transparent barrier layer, a multilayer stretched film with the three-layer structure PET/NY/PET (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having a multilayer sealant with the three-layer structure LLDPE/6,12-nylon/LLDPE through an adhesive layer, and the 6,12-nylon used being a nylon 6/12 resin with residual ε-caprolactam of 0.5 wt % and residual ω-laurolactam of no greater than 0.03 wt %. In a one-side extraction test of the multilayer sealant alone under conditions of 95% ethanol, 121° C., 2 hours, the c-caprolactam elution was no greater than 0.10 mg/square inch, and the ω-laurolactam extraction was 0.02 mg/square inch. The final laminar structure was as follows: transparent vapor deposition layer (1.5 a PET/12μ NY/1.5μ PET), 15μ/adhesive layer, 3μ/(LLDPE-6,12-nylon-LLDPE), 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.003 mg/cm$^2$.

Example 9

For the transparent barrier layer, a multilayer stretched film with the three-layer structure PET/NY/PET (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having a multilayer sealant with the two-layer structure 6,12-nylon/LLDPE through an adhesive layer, and the 6,12-nylon used being a nylon 6/12 resin with residual ε-caprolactam of 0.5 wt % and residual ω-laurolactam of no greater than 0.03 wt %. In a one-side extraction test of the multilayer sealant alone under conditions of 95% ethanol, 121° C., 2 hours, the ε-caprolactam elution was no greater than 0.10 mg/square inch, and the ω-laurolactam extraction was 0.02 mg/square inch. The final laminar structure was as follows: transparent vapor deposition layer (1.5μ PET/12μ NY/1.5μ PET), 12μ/adhesive layer, 3μ/(6,12-nylon-LLDPE), 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.003 mg/cm$^2$.

Example 10

For the transparent barrier layer, a multilayer stretched film with the two-layer structure PET/NY (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having LLDPE through an adhesive layer. The final laminar structure was as follows: transparent vapor deposition (3μ PET/12μ NY), 15μ/adhesive layer, 3μ/LLDPE, 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.005 mg/cm$^2$.

Example 11

For the transparent barrier layer, a multilayer stretched film with the two-layer structure PET/NY (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having a multilayer sealant with the three-layer structure LLDPE/6,12-nylon/LLDPE through an adhesive layer, and the 6,12-nylon used being a nylon 6/12 resin with residual ε-caprolactam of 0.5 wt % and residual ω-laurolactam of no greater than 0.03 wt %. In a one-side extraction test of the multilayer sealant alone under conditions of 95% ethanol, 121° C., 2 hours, the c-caprolactam elution was no greater than 0.10 mg/square inch, and the ω-laurolactam extraction was 0.02 mg/square inch. The final laminar structure was as follows: transparent vapor deposition (3μ PET/12μ NY), 15μ/adhesive layer, 2μ/(LLDPE-6,12-nylon-LLDPE), 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.003 mg/cm$^2$.

Example 12

For the transparent barrier layer, a multilayer stretched film with the two-layer structure PET/NY (product of Gunze, Ltd.) was used as the base material layer of the transparent barrier layer, an inorganic silicon oxide vapor deposition film was formed by a chemical vapor deposition method, and an organic inorganic barrier layer with a barrier property was further formed over this, the transparent barrier layer having a multilayer sealant with the two-layer structure 6,12-nylon/LLDPE through an adhesive layer, and the 6,12-nylon used being a nylon 6/12 resin with residual ε-caprolactam of 0.5 wt % and residual ω-laurolactam of no greater than 0.03 wt %. In a one-side extraction test of the multilayer sealant alone under conditions of 95% ethanol, 121° C., 2 hours, the ε-caprolactam elution was no greater than 0.10 mg/square inch, and the ω-laurolactam extraction was 0.02 mg/square inch. The final laminar structure was as follows: transparent vapor deposition (3μ PET/12μ NY), 15μ/adhesive layer, 3μ/(6,12-nylon-LLDPE), 70μ. The adhesive used was the polyester-based adhesive RU004/H-1 by Rock Paint Co. The LLDPE sealant used was LR-124 by Okamoto Co.

The laminar structure film was cut to 13 cm in the lengthwise direction and 18 cm in the widthwise direction, and a three-way seal was formed to produce a flat pouch. It was then filled with 150 ml of deionized/distilled water and heat sealed at 180° C., after which it was subjected to pressurization and superheating sterilization with a hot water retort sterilizer for 30 minutes at a temperature of 121° C. After cooling to room temperature, the weight of eluted components in the deionized/distilled water was measured to be equivalent to 0.003 mg/cm$^2$.

Comparative Example 1

A packaging material and pouch were produced in the same manner as Example 1, except for using nylon 66, produced by condensation reaction of hexamethylenediamine and adipic acid, instead of nylon 6/12.

The mass of eluted components were measured for the obtained pouch in the same manner as Example 1, and found to be 0.011 mg per 1 cm$^2$ of sealant film contacting with the deionized/distilled water.

Evaluation

In an elution test carried out according to FDA (US Food and Drug Administration) Standard Test §176•170(c), under conditions depending on the type of contents and use conditions, the packaging materials of Examples 1 to 12 were measured for elution mass into the water, upon contact of the sealant layer surface with a sufficient amount of water and heating at 121° C. for 2 hours, and in a similar manner, for elution mass into heptane, upon contact with a sufficient amount of heptane and heating at 66° C. for 2 hours.

Also, in a retort product-specific elution test carried out according to FDA (US Food and Drug Administration) Standard Test §177•1390, the pouches produced from the packaging materials of Examples 1 to 12 were measured for elution mass into deionized/distilled water, upon contact of the sealant layer surface with a sufficient amount of deionized/distilled water and heating at 135° C. for 1 hour.

The results are shown in Table 2 below.

TABLE 2

| | Elution test | | |
| --- | --- | --- | --- |
| | (1) 21CFR §176.170(c) | | (2) 21CFR §177.1390(c) |
| | Water | Heptane | |
| Example 1 | ≤0.5 mg/inch$^2$ | ≤0.5 mg/inch$^2$ | ≤0.05 mg/inch$^2$ |
| Example 2 | ≤0.5 mg/inch$^2$ | ≤0.5 mg/inch$^2$ | ≤0.05 mg/inch$^2$ |
| Example 3 | ≤0.5 mg/inch$^2$ | ≤0.5 mg/inch$^2$ | ≤0.05 mg/inch$^2$ |
| Example 4 | ≤0.5 mg/inch$^2$ | ≤0.5 mg/inch$^2$ | ≤0.05 mg/inch$^2$ |
| Example 5 | ≤0.5 mg/inch$^2$ | ≤0.5 mg/inch$^2$ | ≤0.05 mg/inch$^2$ |
| Example 6 | ≤0.5 mg/inch$^2$ | ≤0.5 mg/inch$^2$ | ≤0.05 mg/inch$^2$ |
| Example 7 | ≤0.5 mg/inch$^2$ | ≤0.5 mg/inch$^2$ | ≤0.05 mg/inch$^2$ |
| Example 8 | ≤0.5 mg/inch$^2$ | ≤0.5 mg/inch$^2$ | ≤0.05 mg/inch$^2$ |
| Example 9 | ≤0.5 mg/inch$^2$ | ≤0.5 mg/inch$^2$ | ≤0.05 mg/inch$^2$ |
| Example 10 | ≤0.5 mg/inch$^2$ | ≤0.5 mg/inch$^2$ | ≤0.05 mg/inch$^2$ |
| Example 11 | ≤0.5 mg/inch$^2$ | ≤0.5 mg/inch$^2$ | ≤0.05 mg/inch$^2$ |
| Example 12 | ≤0.5 mg/inch$^2$ | ≤0.5 mg/inch$^2$ | ≤0.05 mg/inch$^2$ |

EXPLANATION OF SYMBOLS

1. Transparent gas barrier film layer
1a. Polyester-based resin layer
1a'. First polyester-based resin layer
1a". Second polyester-based resin layer
1b. Polyamide-based resin layer
1c. Vapor deposition layer
1d. Base material layer
1da. Polyester-based resin layer
1da'. First polyester-based resin layer
1da". Second polyester-based resin layer
1db. Polyamide-based resin layer
1e. Vapor deposition layer
1f. Gas barrier coated film
2. Adhesive layer
3. Sealant film layer
3a. Layer made of nylon 6/12
3b. Linear low-density polyethylene layer
3b'. First linear low-density polyethylene layer
3b". Second linear low-density polyethylene layer
3c. Polypropylene layer
3c'. First polypropylene layer
3c". Second polypropylene layer

The invention claimed is:

1. A packaging material for boil/retort treatment having at least a transparent gas barrier film layer, an adhesive layer and a sealant film layer in that order,
the packaging material for boil/retort treatment being one in which, when it is heated at 121° C. for 2 hours in contact with a sufficient amount of 95% ethanol in a one-side elution test, the masses of the unreacted residual ε-caprolactam and ω-laurolactam eluting into the 95% ethanol are no greater than 0.15 mg and no greater than 0.04 mg, respectively, per square inch of the sealant film layer.

2. A packaging material for boil/retort treatment having at least a transparent gas barrier film layer, an adhesive layer and a sealant film layer in that order, the packaging material for boil/retort treatment being one in which, when it is extracted at 100° C. for 8 hours in contact with a sufficient amount of water in a one-side elution test, the mass of nitrogen eluting into the water is no greater than 15 μg per square centimeter and no greater than 100 μg per square inch of the sealant film layer.

3. The packaging material for boil/retort treatment according to claim 1, wherein:

the sealant film layer is a layer composed of a multilayer co-extrusion film comprising at least a polypropylene layer and a layer made of nylon 6/12, the polypropylene layer is a layer that forms a wetted surface with the packaging material, and the unreacted residual ε-caprolactam content of the layer made of nylon 6/12 is no greater than 0.8 wt % and the unreacted residual ω-laurolactam content is no greater than 0.1 wt %.

4. The packaging material for boil/retort treatment according to claim 3, wherein the sealant film layer is a multilayer co-extrusion film having a first polypropylene layer, a layer made of nylon 6/12 and a second polypropylene layer, in that order.

5. The packaging material for boil/retort treatment according to claim 1, wherein the sealant film layer is a layer having at least a layer made of linear low-density polyethylene.

6. The packaging material for boil/retort treatment according to claim 5, wherein:

the sealant film layer is a layer composed of a multilayer co-extrusion film comprising at least a linear low-density polyethylene layer and a layer made of nylon 6/12, the linear low-density polyethylene layer is a layer that forms a wetted surface with the packaging material, and the unreacted residual ε-caprolactam content of the layer made of nylon 6/12 is no greater than 0.8 wt % and the unreacted residual ω-laurolactam content is no greater than 0.1 wt %.

7. The packaging material for boil/retort treatment according to claim 1, wherein the transparent gas barrier film layer is a layer made of an inorganic oxide vapor deposition film, comprising at least a base material layer and a vapor deposition layer obtained by vapor deposition of an inorganic oxide on the base material layer.

8. The packaging material for boil/retort treatment according to claim 7, wherein:

the inorganic oxide vapor deposition film further has a gas barrier coated film on the vapor deposition layer, and the gas barrier coated film comprises a hydrolysate of an alkoxide or a hydrolytic condensate of an alkoxide, obtained by polycondensation of a composition comprising at least one alkoxide represented by the general formula $R^1_n M(OR^2)_m$ (where M represents a metal atom, $R^1$ and $R^2$ represent C1-8 organic groups, n is an integer of 0 or greater, m is an integer of one or greater, and n+m represents the valence of M), a polyvinyl alcohol, and/or ethylene-vinyl alcohol, by a sol-gel method.

9. The packaging material for boil/retort treatment according to claim 7, wherein the vapor deposition layer is a layer obtained by vapor deposition of at least one inorganic oxide selected from the group consisting of silicon oxide, aluminum oxide and magnesium oxide.

10. The packaging material for boil/retort treatment according to claim 1, wherein the transparent gas barrier film layer is a layer having a biaxially stretched multilayer film obtained by biaxial stretching of a multilayer film having at least a polyester-based resin layer and a polyamide-based resin layer.

11. The packaging material for boil/retort treatment according to claim 10, wherein the biaxially stretched multilayer film is a biaxially stretched multilayer laminated film having a first polyester-based resin layer, a polyamide-based resin layer and a second polyester-based resin layer, in that order.

12. The packaging material for boil/retort treatment according to claim 10, wherein the transparent gas barrier film layer is a layer made of an inorganic oxide vapor deposition film comprising a biaxially stretched multilayer film, obtained by biaxial stretching of a multilayer film having at least a polyester-based resin layer and a polyamide-based resin layer, and a vapor deposition layer obtained by vapor deposition of an inorganic oxide on one side thereof.

13. The packaging material for boil/retort treatment according to claim 10, wherein:

the polyester-based resin layer contains a crystalline polyester, and the polyamide-based resin layer contains 70 to 99 wt % of an aliphatic polyamide and 1 to 30 wt % of an aromatic polyamide.

14. The packaging material for boil/retort treatment according to claim 13, wherein the crystalline polyester is at least one type of compound selected from the group consisting of polyethylene terephthalate, isophthalic acid-copolymerized polyethylene terephthalate, polybutylene terephthalate and sulfoisophthalic acid-copolymerized polyethylene terephthalate.

15. The packaging material for boil/retort treatment according to claim 13, wherein the aliphatic polyamide is at least one selected from the group consisting of nylon 6, and copolymerized nylon comprising nylon 6 and nylon 66.

16. The packaging material for boil/retort treatment according to claim 13, wherein the aromatic polyamide is polymetaxylene adipamide or amorphous nylon.

17. A pouch for boil/retort treatment comprising a packaging material according to claim 1, the packaging material being layered with the sealant film layer as the innermost layer to form a bag, wherein:

in an impurity elution test in which it is filled with deionized/distilled water and subjected to heat treatment at 135° C. for 1 hour, the weight of impurities eluting into the deionized/distilled water is no greater than 0.008 mg per 1 $cm^2$ area of the sealant film layer bordering the contents.

* * * * *